United States Patent [19]

Burbidge

[11] 3,772,149

[45] Nov. 13, 1973

[54] PRECIPITATION OF VIRUS PARTICLES

[75] Inventor: Colin Burbidge, Crawley, England

[73] Assignee: Beecham Group Limited, Brentford, England

[22] Filed: July 19, 1971

[21] Appl. No.: 164,094

[30] Foreign Application Priority Data

Aug. 15, 1970 Great Britain .................. 39,436/70

[52] U.S. Cl. .................................. 195/1.5, 424/89
[51] Int. Cl. .............................................. C12k 7/00
[58] Field of Search ......................... 195/1.5; 424/89

[56] References Cited

OTHER PUBLICATIONS

Polson et al. Biochemica et Biophysica Acta, Vol. 14, pages 67–70, 1954, copy in POSL Harris, Techniques in Experimental Virology, Published by Academic Press, New York, 1964, Pages 7 & 156.

*Primary Examiner*—Richard L. Huff
*Attorney*—Jacobs & Jacobs

[57] ABSTRACT

A process for the precipitation of virus particles from a suspension thereof in a liquid medium which process comprises adding a nitrogen-containing base to the suspension of virus particles and if necessary adjusting the pH of the liquid medium to a pH below about 5.5, thereby precipitating the virus particles.

89 Claims, No Drawings

PRECIPITATION OF VIRUS PARTICLES

This invention relates to a process for the recovery of virus particles from a suspension thereof.

Suspensions of virus particles in liquid media are in some ways more akin to solutions than true suspensions since the virus particles are of submicroscopic size, and the virus particles themselves are extremely difficult to recover from such suspensions by filtration or by any of the usual mechanical precipitation techniques such as centrifugation. The need for an efficient process for the recovery of virus particles from suspension is well recognised. For example, it may be necessary to remove harmful viruses from suspensions, or alternatively it may be desirable to recover the virus particles prior to the preparation of vaccines or for further scientific study. It would therefore be desirable if an efficient recovery process for virus particles in suspension were available.

In the past yeast ribonucleic acid or a salt thereof has been used as a precipitation agent in the recovery of virus particles from suspension. The ribonucleic acid was added to the suspension of virus particles and the resulting virus particle/ribonucleic acid complex could then be collected by centrifugation or by filtration on a filter press. The efficiency of recovery of this complex of the virus particles with ribonucleic acid was much greater than the efficiency of recovery of the virus particles themselves by simple centrifugation. However, one disadvantage of using yeast ribonucleic acid is that 100 percent recovery of virus particles is not generally possible. In addition it is only on rare occasions that relatively pure suspensions of virus particles are to be treated. Generally the virus particles suspensions are contaiminated by extraneous proteinaceous matter and ribonucleic acid is non-selective in precipitating both the virus particles and the extraneous protein. There is therefore a clear need for precipitation agents which can be added to suspensions of virus particles in liquid media which are both efficient in enabling a high proportion of the virus particles to be recovered and relatively selective in precipitating the virus particles rather than the protein contaiminants.

According to the present invention there is provided a process for the precipitation of virus particles from a suspension thereof in a liquid medium which process comprises adding a nitrogen-containing base to the suspension of virus particles and if necessary adjusting the pH of the liquid medium to a pH below a bout 5.5, thereby precipitating the virus particles.

Suitable nitrogen-containing bases include glucosamine, tryptophan, carbazole, nicotinamide, morpholine, piperidine, triethylamine, urea, diethylamine, triethanolamine, streptomycin, although these agents are not equally effective in the precipitation of the virus particles from suspension. Indeed the efficiency of the bases in precipitating virus particles varies widely and as yet there is no rational method of predicting the efficiency of any particular agent. We have found that urea, streptomycin and glucosamine allow almost 100 percent recovery of virus particles, while piperidine, triethanolamine and triethlamine are about 85 to 100 percent effective in the process.

An additional advantage of the present invention is that these agents are reasonably specific in prcipitating the virus particles from suspension. If the suspension contains proteinaceous impurities these agents will generally precipitate the virus particles from the suspension while precipitating only a small proportion of the extraneous proteinaceous impurity. For example, in the case of urea we have shown that only 10 percent by weight of the total protein content of a crude suspension of virus particles is precipitated with the particles. Clearly this is an advantage when the virus particles are to be recovered in reasonably pure form for further scientific study or for high purity pharmaceutical work such as in the preparation of vaccines and the like.

Precipitation of the virus particles in the present process does not occur unless the pH of the suspension is below about 5.5. Above this level of pH the degree of precipitation which is achieved falls off rapidly. We find that the most effective pH range for the process is between 5.0 and 5.4 although a pH of from about 4.5 to 5.4 would be suitable. As the pH is reduced below about 4.5 the virus particles may be degraded to a greater or lesser degree, and some compromise must be reached between the pH level at which the process is carried out and the degree of degradation of virus particles which can be tolerated.

After the addition of the nitrogen-containing base it is believed that some form of complex is formed between the base and the virus particles. At pH below 5.5 this complex precipitates and the precipitated solids may be recovered from the suspension. Suitable methods for the recovery of the precipitated solids include centrifugation or filtration on a filter press using conventional filter aids.

The amount of nitgrogen-containing base to be used in the present process will clearly vary according to the concentration of the virus suspension. We are not aware of any empirical method of determining the amount of base which is necessary, although one or two preliminary trials will indicate the amount required in any particular case. However, the amount of base will not generally exceed about 1 gram per 100 ml, of virus suspension.

The virus particles may be obtained in free form by resuspending the complex of nitrogenous base and virus particles in an aqueous medium at a pH above the critical level of about 5.5. The complex then dissociates and the virus particles can be resuspended in the aqueous medium. Naturally it will be understood that this second suspension of virus particles may contain a small proportion of extraneous proteinaceous impurity although this level of impurity will be much less than in the original suspension of virus particles. The process of this invention can be repeated if desired in order to reduce still further the proportion of impurity which is present.

The virus particles precipitated by the present process may be further treated if desired. For example, it is on occasions necessary to deproteinise the virus particles in order to obtain the nucleic acid component of the virus. This nucleic acid can be obtained by deproteinisation of the precipitated virus particle/nitrogenous base complex or alternatively by deproteinisation of the free virus particles in suspension obtained as above. The deproteinisation step can be achieved by any suitable means such as by extraction with detergent-containing buffers.

The process of this invention can be applied to suspensions of any virus particle. One application is in the recovery of virus particles of fungal origin from the fermentation medium on or in which an infected fungus has been grown. When infected fungi are grown on or in suitable media the fungal viruses penetrate the mycelial walls and after a period begin to appear in the culture medium itself. If the fermentation broth is clarified by centrifugation and the mycelium is discarded, the resulting liquid medium is essentially a suspension of fungal virus particles together with proteinaceous and other impurities. The virus particles can then be obtained from this clarified broth by the process of this invention. Urea is a particularly suitable nitrogenous base precipitant for use in this application of the process.

The following examples illustrate the process of this invention.

EXAMPLE I

The mould Penicillium stoloniferum A.T.C.C.14586 was cultivated as follows:

Sporulation agar

Table I

Glycerol — 7.5 g./l
Black Treacle — 7.5 g./l
Yeast Extract — 5.0 g./l
NaCl — 10.0 g./l
$MgSO_4.7H_2O$ — 0.005 g./l
$KH_2PO_4$ — 0.006 g./l
$Fe_2(SO_4)_3(NH_4)_2SO_4 \cdot 24H_2O$ — 0.0016 g./l
$CuSO_4.5H_2O$ — 0.0001 g./l
$CaSO_4$ — 0.25 g./l
Agar — 20.0 g./l Medium made up with demineralised water and pH adjusted to 6.6. 40 ml. of medium are added to 8 oz. medicinal bottles which are plugged with cottonwool and steam sterilised for 15 minutes at 121° C.

The slopes are inoculated from the stock culture, which is in soil, and incubated at 26° C until well sporulated.

Barley flask cultures

Cottonwool plugged Thompson bottles containing 150 g. of whole grain barley are steam sterilised for 2 hours at 121° C. The spores from one 8 oz. slope are suspended in 25 ml. of a solution containing glycerol 3.0% by weight and asparagine 0.1%, and this is used to inoculate five barley flasks to each of which is added a further 50 ml. of the suspensing medium. The flasks are incubated at 26° C, and shaken by hand each day until well sporulated, usually by 3 to 4 days. The flasks may be stored for several months at 2° to 3° C.

Fermentation medium
expressed as percentage by weight

Table II

Glycerol — 0.5
Glucose — 0.5
Tryptone — 0.25
Bacteriological Peptone — 0.25
Yeast Extract — 0.125
Corn Steep Liquor — 1.25
$K_2HPO_4$ — 0.1
NaCl — 0.5
Antifoam agent — 0.03
pH adjusted to 7.0

The antifoam used is 10% Pluronic L81 in soyabean oil. The medium is made up with tap water.

Vegetative seed 75 l. of fermentation medium are steam sterilised in a 100 ml. stainless steel baffled fermenter. A suspension of spores obtained by adding 100 ml. sterile water containing 0.01% Tween 80 to a barley flask, and shaking, is used to inoculate the fermenter, which is incubated for 40 hours at 26° C with aeration and agitation.

Fermentation 1,500 l. of fermentation medium are steam sterilised in a 2,000 l. stainless steel, fully baffled fermenter. This is inoculated with 75 l. of vegetative seed and incubated at 26° C for up to 5 days, with aeration and agitation.

Whole fermentation broth (1,500 l.) was then clarified by centrifugation (model SAHR 5036, Westfalia Separator Ltd.) and the mycelium discarded.

To 1,425 l. of the chilled culture filtrate was added 285 l. urea dissolved in 3 l. water. The mixture was acidified to pH 5.0 using 25% v/v sulphuric acid. After stirring for 30 minutes the precipitated solids were collected by centrifugation (Sharples Super Centrifuge).

The percentage recovery of virus particles in the precipitation step was 95.1% (measured by standard sucrose density gradient techniques).

Protein contaminant recoveries were estimated by performing protein determinations on clarified fermentation broth before and after the precipitation step. The determinations were carried out by the standard Lowry method using Folin-Ciocalteu reagent. Optical densities of the coloured complex were read at 750 n.m. The percentage recovery of extraneous protein was 10.3%.

EXAMPLE II

The procedure of Example I was repeated except that other nitrogen-containing bases were substituted for the urea. The proportion of each of these bases was the same as in Example I. The percentage recovery of virus particles is given below for each base.

| Added Base | % Recovery |
|---|---|
| Glucosamine | 100 |
| Tryptopan | 59 |
| Carbazole | 72 |
| Nicotinamide | 100 |
| Morpholine | 60 |
| Piperidine | 96 |
| Triethylamine | 86 |
| Diethylamine | 48 |
| Triethanolamine | 90 |
| Streptomycin | 100 |

For comparison purposes the procedure was repeated using sodium alginate (a non-nitrogenous polysaccharide). The recovery of virus particles was zero percent.

I claim:

1. A process for the precipitation of virus particles from a suspension thereof which contains protein contaminants in a liquid medium which process comprises adding an amount of glucosamine sufficient to precipitate the virus particles to the suspension of virus particles which contains protein contaminants and if necessary adjusting the pH of the liquid medium to a pH below about 5.5 thereby selectively precipitating the virus particles.

2. A process according to claim 1 wherein the virus particles are double-stranded ribonucleic acid containing virus particles and the liquid medium in which they are initially suspended is a culture medium in which a mould infected with such virus particles has been grown.

3. A process according to claim 1 which further comprises resuspending the precipitated virus particles in an aqueous medium at a pH above about 5.5 and recovering the virus particles in free form.

4. A process according to claim 1 wherein the amount sufficient to precipitate the virus particles is not in excess of about 1 gram per 100 ml. of virus suspension.

5. A process according to claim 1 wherein the pH is from 4.5 to 5.4.

6. A process according to claim 5 wherein the pH is from 5.0 to 5.4.

7. A process for the precipitation of virus particles from a suspension thereof which contains protein contaminants in a liquid medium, which process comprises adding an amount of glucosamine sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

8. A process according to claim 7 wherein the amount sufficient to precipitate the virus particles is not in excess of about 1 gram per 100 ml. of virus suspension.

9. A process for the precipitation of virus particles from a suspension thereof which contains protein contaminants in a liquid medium which process comprises adding an amount of tryptophan sufficient to precipitate the virus particles to the suspension of virus particles which contains protein contaminants and if necessary adjusting the pH of the liquid medium to a pH below about 5.5 thereby selectively precipitating the virus particles.

10. A process according to claim 9 wherein the virus particles are double-stranded, ribonucleic-acid-containing virus particles and the liquid medium in which they are initially suspended is a culture medium in which a mould infected with such virus particles has been grown.

11. A process according to claim 9 wherein the virus particles are double-stranded, ribonucleic-acid-containing virus particles and the liquid medium in which they are initially suspended is a culture medium on which a mould infected with such virus particles has been grown.

12. A process according to claim 9 which further comprises resuspending the precipitated virus particles in an aqueous medium at a pH above about 5.5 and recovering the virus particles in free form.

13. A process according to claim 9 wherein the amount sufficient to precipitate the virus particles is not in excess of about 1 gram per 100 ml. of virus suspension.

14. A process according to claim 9 wherein the pH is from 4.5 to 5.4.

15. A process according to claim 14 wherein the pH is from 5.0 to 5.4.

16. A process for the precipitation of virus particles from a suspension thereof which contains protein contaminants in a liquid medium which process comprises adding an amount of carbazole sufficient to precipitate the virus particles to the suspension of virus particles which contains protein contaminants and if necessary adjusting the pH of the liquid medium to a pH below about 5.5 thereby selectively precipitating the virus particles.

17. A process according to claim 16 wherein the virus particles are double-stranded, ribonucleic-acid-containing virus particles and the liquid medium in which they are initially suspended is a culture medium in which a mould infected with such virus particles has been grown.

18. A process according to claim 16 wherein the virus particles are double-stranded, ribonucleic-acid-containing virus particles and the liquid medium in which they are initially suspended is a culture medium on which a mould infected with such virus particles has been grown.

19. A process according to claim 16 which further comprises resuspending the precipitated virus particles in an aqueous medium at a pH above about 5.5 and recovering the virus particles in free form.

20. A process according to claim 16 wherein the amount sufficient to precipitate the virus particles is not in excess of about 1 gram per 100 ml. of virus suspension.

21. A process according to claim 16 wherein the pH is from 4.5 to 5.4.

22. A process according to claim 21 wherein the pH is from 5.0 to 5.4.

23. A process for the precipitation of virus particles from a suspension thereof which contains protein contaminants in a liquid medium which process comprises adding an amount of nicotinamide sufficient to precipitate the virus particles to the suspension of virus particles which contains protein contaminants and if necessary adjusting the pH of the liquid medium to a pH below about 5.5 thereby selectively precipitating the virus particles.

24. A process according to claim 23 wherein the virus particles are double-stranded, ribonucleic-acid-containing virus particles and the liquid medium in which they are initially suspended is a culture medium in which a mould infected with such virus particles has been grown.

25. A process according to claim 23 wherein the virus particles are double-stranded, ribonucleic-acid-containing virus particles and the liquid medium in which they are initially suspended is a culture medium on which a mould infected with such virus particles has been grown.

26. A process according to claim 23 which further comprises resuspending the precipitated virus particles in an aqueous medium at a pH above about 5.5 and recovering the virus particles in free form.

27. A process according to claim 23 wherein the amount sufficient to precipitate the virus particles is not in excess of about 1 gram per 100 ml. of virus suspension.

28. A process according to claim 23 wherein the pH is from 4.5 to 5.4.

29. A process according to claim 28 wherein the pH is from 5.0 to 5.4.

30. A process for the precipitation of virus particles from a suspension thereof which contains protein contaminants in a liquid medium which process comprises adding an amount of morpholine sufficient to precipitate the virus particles to the suspension of virus particles which contains protein contaminants and if necessary adjusting the pH of the liquid medium to a pH below about 5.5 thereby selectively precipitating the virus particles.

31. A process according to claim 30 wherein the virus particles are double-stranded, ribonucleic-acid-containing virus particles and the liquid medium in which they are initially suspended is a culture medium in which a mould infected with such virus particles has been grown.

32. A process according to claim 30 wherein the virus particles are double-stranded, ribonucleic-acid-containing virus particles and the liquid medium in which they are initially suspended is a culture medium on which a mould infected with such virus particles has been grown.

33. A process according to claim 30 which further comprises resuspending the precipitated virus particles in an aqueous medium at a pH above about 5.5 and recovering the virus particles in free form.

34. A process according to claim 30 wherein the amount sufficient to precipitate the virus particles is not in excess of about 1 gram per 100 ml. of virus suspension.

35. A process according to claim 30 wherein the pH is from 4.5 to 5.4.

36. A process according to claim 35 wherein the pH is from 5.0 to 5.4.

37. A process for the precipitation of virus particles from a suspension thereof which contains protein contaminants in a liquid medium which process comprises adding an amount of piperidine sufficient to precipitate the virus particles to the suspension of virus particles which contains protein contaminants and if necessary adjusting the pH of the liquid medium to a pH below about 5.5 thereby selectively precipitating the virus particles.

38. A process according to claim 37 wherein the virus particles are double-stranded, ribonucleic-acid-containing virus particles and the liquid medium in which they are initially suspended is a culture medium in which a mould infected with such virus particles has been grown.

39. A process according to claim 37 wherein the virus particles are double-stranded, ribonucleic-acid-containing virus particles and the liquid medium in which they are initially suspended is a culture medium on which a mould infected with such virus particles has been grown.

40. A process according to claim 37 which further comprises resuspending the precipitated virus particles in an aqueous medium at a pH above about 5.5 and recovering the virus particles in free form.

41. A process according to claim 37 wherein the amount sufficient to precipitate the virus particles is not in excess of about 1 gram per 100 ml. of virus suspension.

42. A process according to claim 37 wherein the pH is from 4.5 to 5.4.

43. A process according to claim 42 wherein the pH is from 5.0 to 5.4.

44. A process for the precipitation of virus particles from a suspension thereof which contains protein contaminants in a liquid medium which process comprises adding an amount of triethylamine sufficient to precipitate the virus particles to the suspension of virus particles which contains protein contaminants and if necessary adjusting the pH of the liquid medium to a pH below about 5.5 thereby selectively precipitating the virus particles.

45. A process according to claim 44 wherein the virus particles are double-stranded, ribonucleic-acid-containing virus particles and the liquid medium in which they are initially suspended is a culture medium in which a mould infected with such virus particles has been grown.

46. A process according to claim 44 wherein the virus particles are double-stranded, ribonucleic-acid-containing virus particles and the liquid medium in which they are initially suspended is a culture medium on which a mould infected with such virus particles has been grown.

47. A process according to claim 44 which further comprises resuspending the precipitated virus particles in an aqueous medium at a pH above about 5.5 and recovering the virus particles in free form.

48. A process according to claim 44 wherein the amount sufficient to precipitate the virus particles is not in excess of about 1 gram per 100 ml. of virus suspension.

49. A process according to claim 44 wherein the pH is from 4.5 to 5.4.

50. A process according to claim 49 wherein the pH is from 5.0 to 5.4.

51. A process for the precipitation of virus particles from a suspension thereof which contains protein contaminants in a liquid medium which process comprises adding an amount of diethylamine sufficient to precipitate the virus particles to the suspension of virus particles which contains protein contaminants and if necessary adjusting the pH of the liquid medium to a pH below about 5.5 thereby selectively precipitating the virus particles.

52. A process according to claim 51 wherein the virus particles are double-stranded, ribonucleic-acid-containing virus particles and the liquid medium in which they are initially suspended is a culture medium in which a mould infected with such virus particles has been grown.

53. A process according to claim 51 wherein the virus particles are double-stranded, ribonucleic-acid-containing virus particles and the liquid medium in which they are initially suspended is a culture medium on which a mould infected with such virus particles has been grown.

54. A process according to claim 51 which further comprises resuspending the precipitated virus particles in an aqueous medium at a pH above about 5.5 and recovering the virus particles in free form.

55. A process according to claim 51 wherein the amount sufficient to precipitate the virus particles is not in excess of about 1 gram per 100 ml. of virus suspension.

56. A process according TO claim 51 wherein the pH is from 4.5 to 5.4.

57. A process according to claim 56 wherein the pH is from 5.0 to 5.4.

58. A process for the precipitation of virus particles from a suspension thereof which contains protein contaminants in a liquid medium which process comprises adding an amount of triethanolamine sufficient to precipitate the virus particles to the suspension of virus particles which contains protein contaminants and if necessary adjusting the pH of the liquid medium to a pH below about 5.5 thereby selectively precipitating the virus particles.

59. A process according to claim 58 wherein the virus particles are double-stranded, ribonucleic-acid-containing virus particles and the liquid medium in which they are initially suspended is a culture medium in which a mould infected with such virus particles has been grown.

60. A process according to claim 58 wherein the virus particles are double-stranded, ribonucleic-acid-containing virus particles and the liquid medium in which they are initially suspended is a culture medium on which a mould infected with such virus particles has been grown.

61. A process according to claim 58 which further comprises resuspending the precipitated virus particles in an aqueous medium at a pH above about 5.5 and recovering the virus particles in free form.

62. A process according to claim 58 wherein the amount sufficient to precipitate the virus particles is not in excess of about 1 gram per 100 ml. of virus suspension.

63. A process according to claim 58 wherein the pH is from 4.5 to 5.4.

64. A process according to claim 63 wherein the pH is from 5.0 to 5.4.

65. A process for the precipitation of virus particles from a suspension thereof which contains protein contaminants in a liquid medium which process comprises adding an amount of streptomycin sufficient to precipitate the virus particles to the suspension of virus particles which contains protein contaminants and if necessary adjusting the pH of the liquid medium to a pH below about 5.5 thereby selectively precipitating the virus particles.

66. A process according to claim 65 wherein the virus particles are double-stranded, ribonucleic-acid-containing virus particles and the liquid medium in which they are initially suspended is a culture medium in which a mould infected with such virus particles has been grown.

67. A process according to claim 65 wherein the virus particles are double-stranded, ribonucleic-acid-containing virus particles and the liquid medium in which they are initially suspended is a culture medium on which a mould infected with such virus particles has been grown.

68. A process according to claim 65 which further comprises resuspending the precipitated virus particles in an aqueous medium at a pH above the about 5.5 and recovering the virus particles in free form.

69. A process according to claim 65 wherein the amount sufficient to precipitate the virus particles is not in excess of about 1 gram per 100 ml. of virus suspension.

70. A process according to claim 65 wherein the pH is from 4.5 to 5.4.

71. A process according to claim 70 wherein the pH is from 5.0 to 5.4.

72. A process for the precipitation of virus particles from a suspension thereof which contains protein contaminants in a liquid mediu, which process comprises adding an amount of tryptophan sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

73. A process according to claim 72 wherein the amount sufficient to precipitate the virus particles is not in excess of about 1 gram per 100 ml. of virus suspension.

74. A process for the precipitation of virus particles from a suspension thereof which contains protein contaminants in a liquid medium, which process comprises adding an amount of carbazole sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

75. A process according to claim 74 wherein the amount sufficient to precipitate the virus particles is not in excess of about 1 gram per 100 ml. of virus suspension.

76. A process for the precipitation of virus particles from a suspension thereof which contains protein contaminants in a liquid medium, which process comprises adding an amount of nicotinamide sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

77. A process according to claim 76 wherein the amount sufficient to precipitate the virus particles is not in excess of about 1 gram per 100 ml. of virus suspension.

78. A process for the precipitation of virus particles from a suspension thereof which contains protein contaminants in a liquid medium, which process comprises adding an amount of morpholine sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

79. A process according to claim 78 wherein the amount sufficient to precipitate the virus particles is not in excess of about 1 gram per 100 ml. of virus suspension.

80. A process for the precipitation of virus particles from a suspension thereof which contains protein contaminants in a liquid medium, which process comprises adding an amount of piperidine sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

81. A process according to claim 80 wherein the amount sufficient to precipitate the virus particles is not in excess of about 1 gram per 100 ml. of virus suspension.

82. A process for the precipitation of virus particles from a suspension thereof which contains protein contaminants in a liquid medium, which process comprises adding an amount of triethylamine sufficient to precipitate the virus particles to the suspension of virus particles which contains protein contaminants and if necessary adjusting the pH of the liquid medium to a pH of 4.5 to 5.5 thereby selectively precipitating the virus particles and recovering the virus particles.

83. A process according to claim 82 wherein the amount sufficient to precipitate the virus particles is not in excess of about 1 gram per 100 ml. of virus suspension.

84. A process for the precipitation of virus particles from a suspension thereof which contains protein contaminants in a liquid medium, which process comprises adding an amount of diethylamine sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

85. A process according to claim 84 wherein the amount sufficient to precipitate the virus particles is not in excess of about 1 gram per 100 ml. of virus suspension.

86. A process for the precipitation of virsu particles from a suspension thereof which contains protein contaminants in a liquid mediu, which process comprises adding an amount of theithanolamine sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

87. A process according to claim 86 wherein the amount sufficient to precipitate the virus particles is not in excess of about 1 gram per 100 ml. of virus suspension.

88. A process for the precipitation of virus particles from a suspension thereof which contains protein contaminants in a liquid medium, which process comprises adding an amount of streptomycin sufficient to precipitate the virus particles to the suspension of virus particles which contains protein contaminants and if necessary adjusting the pH of the liquid medium to a pH of 4.5 to 5.4 thereby selectively precipitating the virus particles and recovering the virus particles.

89. A process according to claim 88 wherein the amount sufficient to precipitate the virus particles is not in excess of about 1 gram per 100 ml. of virus suspension.

* * * * *